US009911355B2

(12) United States Patent
Aaron et al.

(10) Patent No.: US 9,911,355 B2
(45) Date of Patent: Mar. 6, 2018

(54) COMPREHENSION IN RAPID SERIAL VISUAL PRESENTATION

(71) Applicant: INTERNATIONAL BUSINESS MACHINES CORPORATION, Armonk, NY (US)

(72) Inventors: Andrew S. Aaron, Ardsley, NY (US); Ellen E. Kislal, Wellesley Hills, MA (US); Jonathan Lenchner, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 14/743,603

(22) Filed: Jun. 18, 2015

(65) Prior Publication Data
US 2016/0125755 A1  May 5, 2016

Related U.S. Application Data

(63) Continuation of application No. 14/533,342, filed on Nov. 5, 2014.

(51) Int. Cl.
G09B 5/00 (2006.01)
G09B 17/04 (2006.01)
G09B 5/02 (2006.01)
G09B 17/00 (2006.01)

(52) U.S. Cl.
CPC .............. *G09B 17/04* (2013.01); *G09B 5/02* (2013.01); *G09B 17/003* (2013.01)

(58) Field of Classification Search
USPC ........................................... 434/169
See application file for complete search history.

(56) References Cited

U.S. PATENT DOCUMENTS

| | | |
|---|---|---|
| 2003/0038754 A1 | 2/2003 | Goldstein et al. |
| 2005/0234724 A1 | 10/2005 | Aaron et al. |
| 2007/0173699 A1 | 7/2007 | Mathan et al. |
| 2013/0159850 A1 | 6/2013 | Cohn |

OTHER PUBLICATIONS

IBM "Interactive Visual Synthesis of Analytic Knowledge" ip.com. Sep. 2009. (15 Pages).
IBM "Accessible multidimensional text displays" ip.com. Nov. 2009. (5 Pages).

*Primary Examiner* — Kesha Frisby
(74) *Attorney, Agent, or Firm* — Tutunjian & Bitetto, P.C.; Yeen C. Tham

(57) ABSTRACT

Methods and a system are provided. A method includes receiving a plurality of words comprised in a Rapid Serial Visual Presentation. The method further includes determining a cognitive load of the plurality of words by using at least one metric. The cognitive load is determined on any of a word level and a word sequence level. The method also includes calculating a variable presentation rate for the plurality of words based on the cognitive load. The variable presentation rate is capable of being varied on any of the word level and the word sequence level. The method additionally includes controlling a displaying of the plurality of words on a display device in accordance with the calculated variable presentation rate.

18 Claims, 6 Drawing Sheets

COMPREHENSION IN RAPID SERIAL VISUAL PRESENTATION

CROSS-REFERENCE TO RELATED APPLICATIONS

This application is a Continuation application of co-pending U.S. patent application Ser. No. 14/533,342 filed on Nov. 5, 2014 incorporated herein by reference in its entirety.

BACKGROUND

Technical Field

The present invention relates generally to cognitive and contextual computing and, in particular, to improving comprehension in a Rapid Serial Visual Presentation.

Description of the Related Art

Rapid Serial Visual Presentation (or RSVP) is a method of presenting words sequentially in a fixed location to allow users to read text on a very small display. Conventional reading requires scanning lines of text using rapid eye movements ("saccades"). In contrast, RSVP permits the reader to keep a fixed gaze in one location and take in words as they are presented on a display. This has the potential to increase reading speed because no eye movements are required during reading, resulting in increased efficiency and saving of time. While adults typically read at 250 to 300 Words Per Minute (WPM), RSVP allows adults to read passages up to 650 WPM.

In addition, RSVP allows an unlimited amount of text to be displayed on a minimal amount of space. For example, a user could potentially read an entire novel on a watch display. This makes RSVP well-suited to mobile devices.

However one of the problems with RSVP is that users find it tiring to use for any length of time. It is typically stressful to read long passages on an RSVP display. Words are pitched to the user at a constant rate, even though the cognitive requirement of every word or phrase is not equal.

SUMMARY

According to an aspect of the present principles, a method is provided. The method includes receiving a plurality of words comprised in a Rapid Serial Visual Presentation. The method further includes determining a cognitive load of the plurality of words by using at least one metric. The cognitive load is determined on any of a word level and a word sequence level. The method also includes calculating a variable presentation rate for the plurality of words based on the cognitive load. The variable presentation rate is capable of being varied on any of the word level and the word sequence level. The method additionally includes controlling a displaying of the plurality of words on a display device in accordance with the calculated variable presentation rate.

According to another aspect of the present principles, a system is provided. The system includes a cognitive load estimator for receiving a plurality of words comprised in a Rapid Serial Visual Presentation and determining a cognitive load of the plurality of words by using at least one metric. The cognitive load is determined on any of a word level and a word sequence level. The system further includes a word presentation variable rate calculator for calculating a variable presentation rate for the plurality of words based on the cognitive load. The variable presentation rate is capable of being varied on any of the word level and the word sequence level. The method also includes a processor-based presentation rate controller for controlling a displaying of the plurality of words on a display device in accordance with the calculated variable presentation rate.

According to yet another aspect of the present principles, a method is provided. The method includes receiving a plurality of words comprised in a Rapid Serial Visual Presentation. The method further includes determining a cognitive load of the plurality of words by using at least one metric. The cognitive load is determined based on at least one of a word level, a word sequence level, a moving average of recently viewed word or word sequences, a trend in the moving average of recently viewed word or word sequences. The method also includes calculating a variable presentation rate for the plurality of words based on the cognitive load. The variable presentation rate is capable of being varied on any of the word level and the word sequence level. The method additionally includes controlling a displaying of the plurality of words on a display device in accordance with the calculated variable presentation rate.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to improving comprehension in a Rapid Serial Visual Presentation (RSVP).

In an embodiment, the present principles identify sections of difficult text in a RSVP, and slow down the presentation of the identified sections. In an embodiment, text in an RSVP is determined to be difficult and/or otherwise require corrective action in the presentation rate thereof based on the cognitive load of the text. Thus, while current RSVP systems don't truly "understand" the content of the text they are displaying, the present principles advantageously propose estimating the local cognitive load, e.g. the degree to which the executive control of working memory is taxed by the current and surrounding words. In an embodiment, the cognitive load of words and word sequences in the RSVP can be indicated using one or more metrics.

Figure 1:
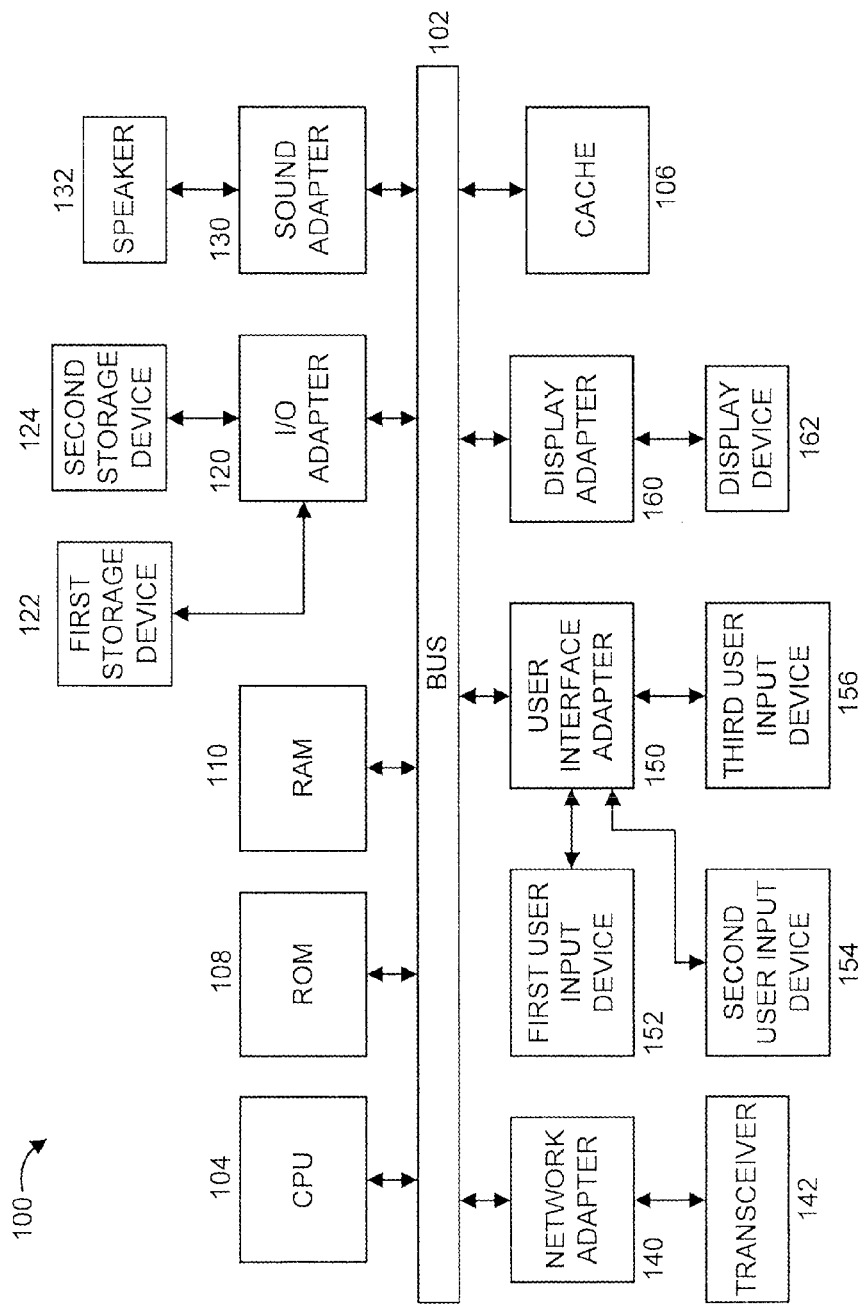
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
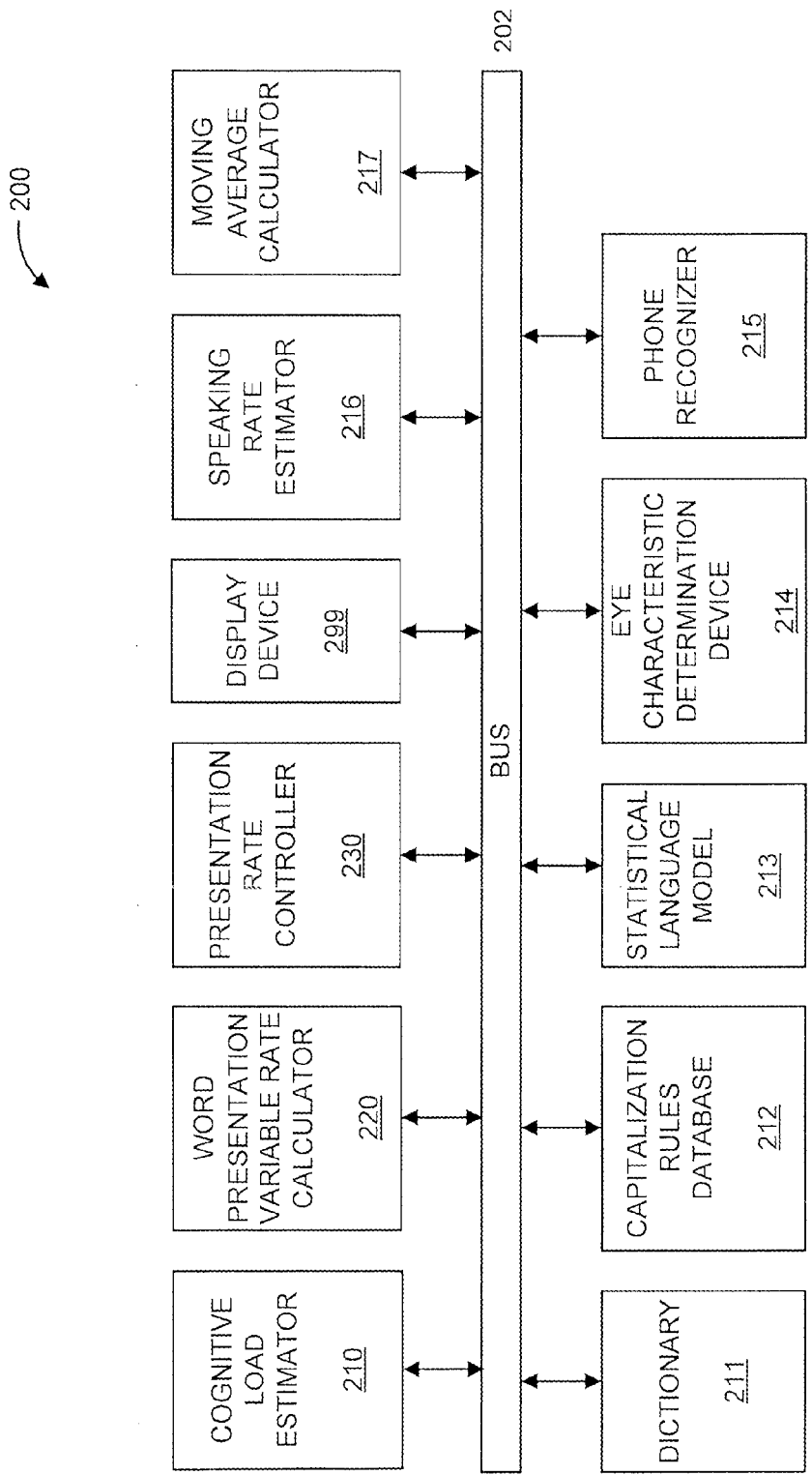
FIG. 2 shows an exemplary system 200 for improving comprehension in a Rapid Serial Visual Presentation (RSVP), in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
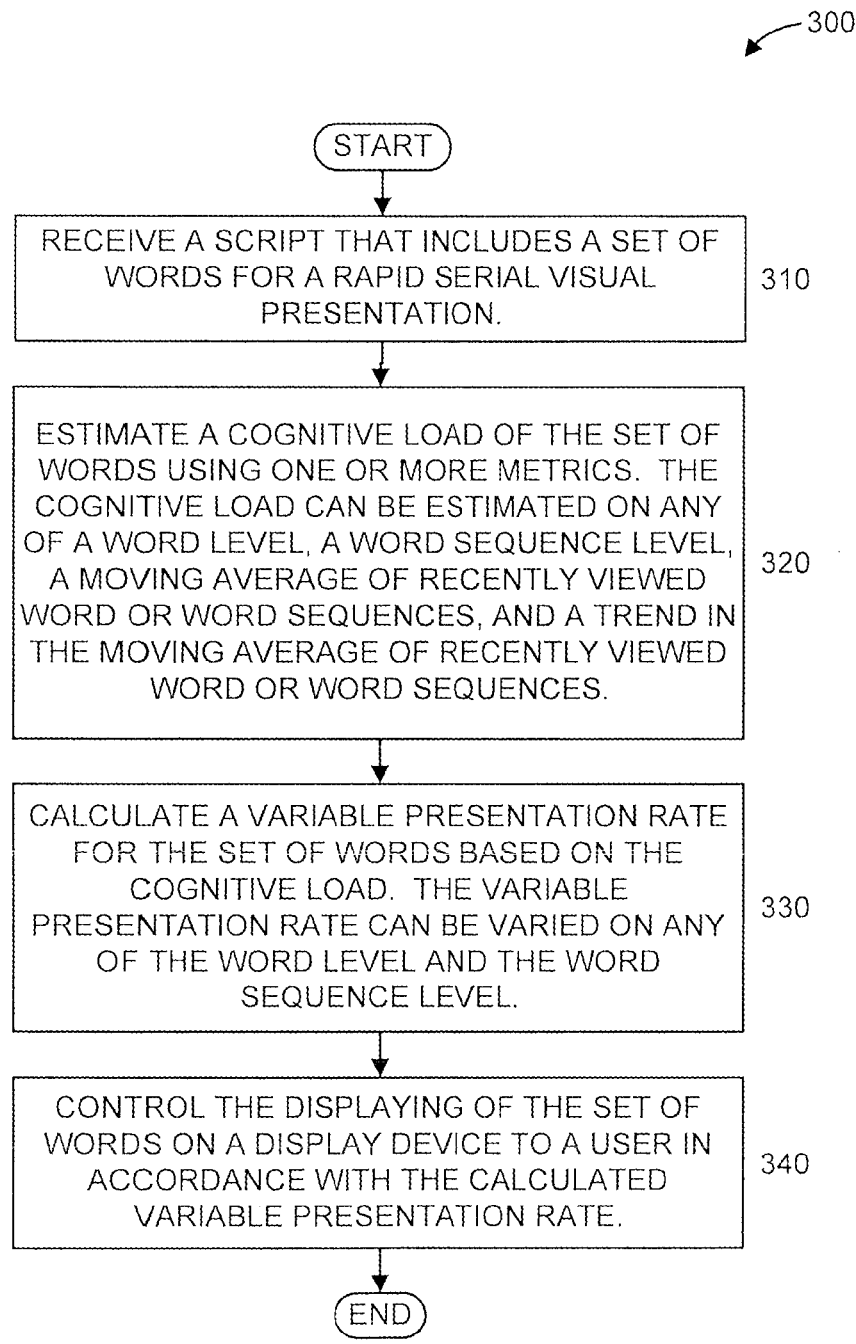
FIG. 3 shows an exemplary method 300 for improving comprehension in a Rapid Serial Visual Presentation (RSVP), in accordance with an embodiment of the present principles.

Further, it is to be appreciated that processing system 100 may perform at least part of the method described herein including, for example, at least part of method 300 of FIG. 3. Similarly, part or all of system 200 may be used to perform at least part of method 300 of FIG. 3.

FIG. 2 shows an exemplary system 200 for improving comprehension in a Rapid Serial Visual Presentation (RSVP), in accordance with an embodiment of the present principles.

The system 200 includes a cognitive load estimator 210, a word presentation variable rate calculator 220, and a presentation rate controller 230. The system 200 can include or interface with a display device 299.

Moreover, in an embodiment, the system can further include a dictionary 211, a capitalization rules database 212, a statistical language model 213, an eye characteristic determination device 214, a phone recognizer 215, a speaking rate estimator 216, and a moving average calculator 217. In an embodiment, elements 211 through 217 can be used by system 200 to estimate cognitive load. In the embodiment of FIG. 2, the preceding elements 211 through 217 are shown separate from the cognitive load estimator 210. However, in other embodiments, one or more of elements 211 through 217 can be included in the cognitive load estimator 210.

The cognitive load estimator 210 estimates the cognitive load of the words that are included in the RSVP. In an embodiment, the cognitive load is estimated and/or otherwise represented using one or more metrics. Exemplary metrics are described herein. As noted above, cognitive load refers to the degree to which the executive control of working memory is taxed by the current and surrounding words.

In an embodiment, one or more of elements 211 through 217 are used to determine the one or more metrics. For example, in an embodiment, the dictionary 211 can be used to determine a dictionary-based metric for identifying words in the RSVP that are absent from the dictionary 211 responsive to a comparison of the words in the RSVP against existing words in the dictionary 211. In an embodiment, the capitalization rules database 212 can be used to determine a capitalization-based metric for identifying unfamiliar proper nouns from among the words in the RSVP responsive to a comparison of the words in the RSVP against capitalization rules stored in the database 212. In an embodiment, the statistical language model 213 can be used to determine a statistical-language-model-based metric for identifying any words and word sequences in the RSVP having a respective low probability of occurrence responsive to a comparison of the words in the RSVP against the statistical language model 213. In an embodiment, the eye characteristic determination device 214 includes an imaging device and can be used to determine an eye-based metric for identifying at least one of an increased rate of eye blinks and an increased pupil dilation, e.g., in relation to a predetermined eye blink range and a predetermined pupil dilation range. In an embodiment, the phone recognizer 215 can be used to create a phone-based metric for counting phones in the words in the RSVP, for example counting either the number of distinct phones or the total number of phones. In an embodiment, the speaking rate estimator 216 can be used to estimate a speaking rate responsive to the number of phones identified. In an embodiment, the estimated speaking rate can be used to control the presentation rate of the words in the RSVP. In an embodiment, the moving average calculator 217 can be used to create a moving average based metric based on a moving average of recently viewed word or word sequences, and/or a trend in the moving average of recently viewed word or word sequences, which can then be used to estimate cognitive load.

In an embodiment, indications provided by these metrics can be used to represent the cognitive load of words and/or word sequences in the RSVP. For example, in an embodiment, the existence of the conditions (e.g., unknown words (in general), unknown proper nouns (more specifically), low language model score, increased rate of eye blinks, increased pupil dilation, a number of phones in a word being above a threshold, etc.) being evaluated by the one or more metrics typically results in an indication of an increased local cognitive load. Unknown words can be words unknown to the language model and/or unknown to the user. Regarding the latter, the language model may be able to be modified by a user to only include words known by the user. For example, the user may be provided with a list of words occurring in the language model ahead of time, and may remove words unknown to the user.

The word presentation variable rate calculator 220 calculates the presentation rate of the words that are included in the RSVP responsive to the estimated cognitive load. The presentation rate can be varied on any of a word level and a word sequence level. A word level includes just one word. A word sequence can include 2 or more words in a same grammatical structure or container (e.g., phrase, clause, sentence, paragraph, page, etc.), but will always be less than all of the words in the RSVP.

The presentation rate controller 230 controls the presentation of the words included in the RSVP on the display device 299 responsive to the presentation rate calculated by the presentation rate calculator 220. Thus, the presentation rate can be varied by the presentation rate controller 230 for a word or a word sequence that is deemed (estimated) to have a high cognitive load.

The display device 299 can be a standalone device or can be incorporated into another device. The other device can be a mobile device or a stationary device. In an embodiment, display device 299 is incorporated into a mobile device. The mobile device can be any type of mobile device including, but not limited to, any of the following: an e-book; an e-reader; a cell phone; a watch; a personal digital assistant; a tablet; a laptop; and so forth. It is to be appreciated that the preceding examples of mobile device is merely exemplary and, thus, other mobile devices can also be used while maintaining the spirit of the present principles.

In the embodiment shown in FIG. 2, the elements thereof are interconnected by a bus 202. However, in other embodiments, other types of connections can also be used. Moreover, in an embodiment, at least the word presentation variable rate calculator 220 is processor-based. However, in other embodiments, other elements of system 200 can be processor-based. Moreover, in yet other embodiments, a centralized processor (e.g., CPU 104) can be used. These and other variations of the elements of system 200 are readily determined by one of ordinary skill in the art, given the teachings of the present principles provided herein, while maintaining the spirit of the present principles.

FIG. 3 shows an exemplary method 300 for improving comprehension in a Rapid Serial Visual Presentation (RSVP), in accordance with an embodiment of the present principles.

At step 310, receive a script that includes a set of words for a Rapid Serial Visual Presentation. In an embodiment, step 310 is performed by the cognitive load estimator 210.

At step 320, estimate a cognitive load of the set of words using one or more metrics. In an embodiment, step 320 can include determining one or more of the following metrics: a dictionary-based metric; a capitalization-based metric; a statistical-language-model-based metric; an eye-based metric; and a phone-based metric. In an embodiment, the existence of some of the conditions (e.g., an unknown word) being evaluated by the one or more metrics typically result in the estimate of the cognitive load being determined as an increased cognitive load. In an embodiment, the cognitive load is estimated based on any of a word level, a word sequence level, a moving average of recently viewed word or word sequences, and a trend in the moving average of recently viewed word or word sequences. In an embodiment, step 320 is performed by the cognitive load estimator 210.

Cognitive load refers to the amount of working memory needed to process a piece of information, or a sentence, or a phrase, or a word. Hence, cognitive load is referring to how complicated, or how hard to read, the text is. Working memory can hold a limited amount of information, and it can only perform a limited number of operations on that information. Thus, simple sentences present a low cognitive load, and complex sentences present a high cognitive load.

At step 330, calculate a variable presentation rate for the set of words based on the cognitive load. The variable presentation rate is capable of being varied on any of a word level and a word sequence level. Thus, for a word or word sequence determined to have an increased cognitive load, the presentation rate is decreased. Conversely, for a word by word sequence determined to have a reduced cognitive load (e.g., from a baseline cognitive load or the previous (here, increased) cognitive load), the presentation rate is increased. In an embodiment, step 330 is performed by the word presentation variable rate calculator 220.

At step 340, control the displaying of the set of words on a display device (e.g., display device 299) to a user in accordance with the calculated variable presentation rate. In an embodiment, step 340 is performed by the presentation rate controller 230.

Thus, the present principles involve determining which groups of words in a RSVP are likely to be harder to read. To that end, there are several metrics that can be employed. In an embodiment, these metrics can relate to cognitive load. We provide the following exemplary metrics. However, it is to be appreciated that the present principles are not limited to solely the following metrics and, thus, other metrics can also be used as readily contemplated by one of ordinary skill in the art given the teachings of the present principles provided herein, while maintaining the spirit of the present principles.

It is believed that the presence of unknown words increases cognitive load and correspondingly slows down a person's reading tempo in RSVP. Thus, in an embodiment, a dictionary-based metric can be used to identify any words in the RSVP that are absent from a dictionary (e.g., dictionary 211) responsive to a comparison of the words in the RSVP against existing words in the dictionary. Hence, in an embodiment, the dictionary-based metric can be used to indicate comparison results. In an embodiment, the dictionary can be less than all-inclusive, so as to better represent the actual vocabulary possessed by a majority of readers. In an embodiment, multiple dictionaries can be used for dictionary 211, with each of the multiple dictionaries being tailored to a particular person and/or level of knowledge and/or so forth.

It is believed that the presence of unknown proper nouns increases cognitive load and correspondingly slows down a person's reading tempo in RSVP. For example, some people may attempt to recognize the person whose name is read in RSVP or to remember details about the person believed to correspond to the name, in both cases impacting cognitive load from the usual expected cognitive load. Thus, in an embodiment, a capitalization-based metric can be used to identify unfamiliar proper nouns from among the words in the RSVP responsive to a comparison of the words in the RSVP against capitalization rules. The capitalization rules can be stored in a database (e.g., capitalization rules database 212). Moreover, in an embodiment, a database of known words (e.g., dictionary 211) can be used along with database 212, with database 212 being used to identify proper nouns in the first place and dictionary 211 being used to flag an identified proper noun as being (likely) unknown. Hence, in an embodiment, the capitalization-based metric can be used to indicate comparison results.

It is believed that words or word sequences that receive a low language model probability score are typically harder to read. Thus, in an embodiment, a statistical-language-model-based metric can be used to identify any words and word sequences in the RSVP having a respective low probability of occurrence responsive to a comparison of the words and word sequences in the RSVP against a statistical language model (e.g., statistical language model 213). Hence, in an embodiment, the statistical-language-model-based metric can be used to indicate probability. In an embodiment, the probability can be indicated as a percentage of likelihood. In another embodiment, the probability can be indicated as one of multiple levels (e.g., low probability, medium probability, high probability, and so forth). Of course, other expressions can be used to indicate probability for the statistical-language-model-based metric, while maintaining the spirit of the present principles. The adjustment of the presentation rate can vary depending upon which set of expressions is used. That is, in an embodiment, the more expressions there are (low, medium and high versus just low and high), the finer the adjustment can be to the rate.

It is believed that an increased rate of eye blinks or increased pupil dilation can indicate an increase in cognitive load imposed on a reader of an RSVP. Thus, in an embodiment, an eye-based metric can be used to identify an increased rate of eye blinks and/or increased pupil dilation in relation to a predetermined eye blink range and a predetermined pupil dilation range. The predetermined ranges can be determined from a sampling of individuals or can be determined from the current user, either during the current session of RSVP and/or based on prior sessions of RSVP. The predetermined ranges can be considered baselines.

It is believed that words that include more phones can take longer to read. Thus, in an embodiment, a phone-based metric can be used to identify phones in the words in the RSVP. In an embodiment, the presentation rate of the words in the RSVP can be temporarily reduced responsive to an amount of the phones in one or more words being above a threshold. In an embodiment, a speaking rate of the words in the RSVP can be estimated (e.g., by the speaking rate estimator 216) using the phone-based metric. In an embodiment, the variable presentation rate of the words in the RSVP can be calculated responsive to the estimated speaking rate. Thus, human speaking rate could serve as a proxy for reading rate.

In an embodiment, if any of these conditions are met, the RSVP display will slow down and allow the reader more time to take in the text.

False positives are not a concern. If occasionally a simple sentence is displayed a little slower than necessary, this will escape most people's notice. However, if we can catch a reasonable percentage of difficult-to-read text and slow it down, we can greatly increase overall comprehension and reading comfort.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
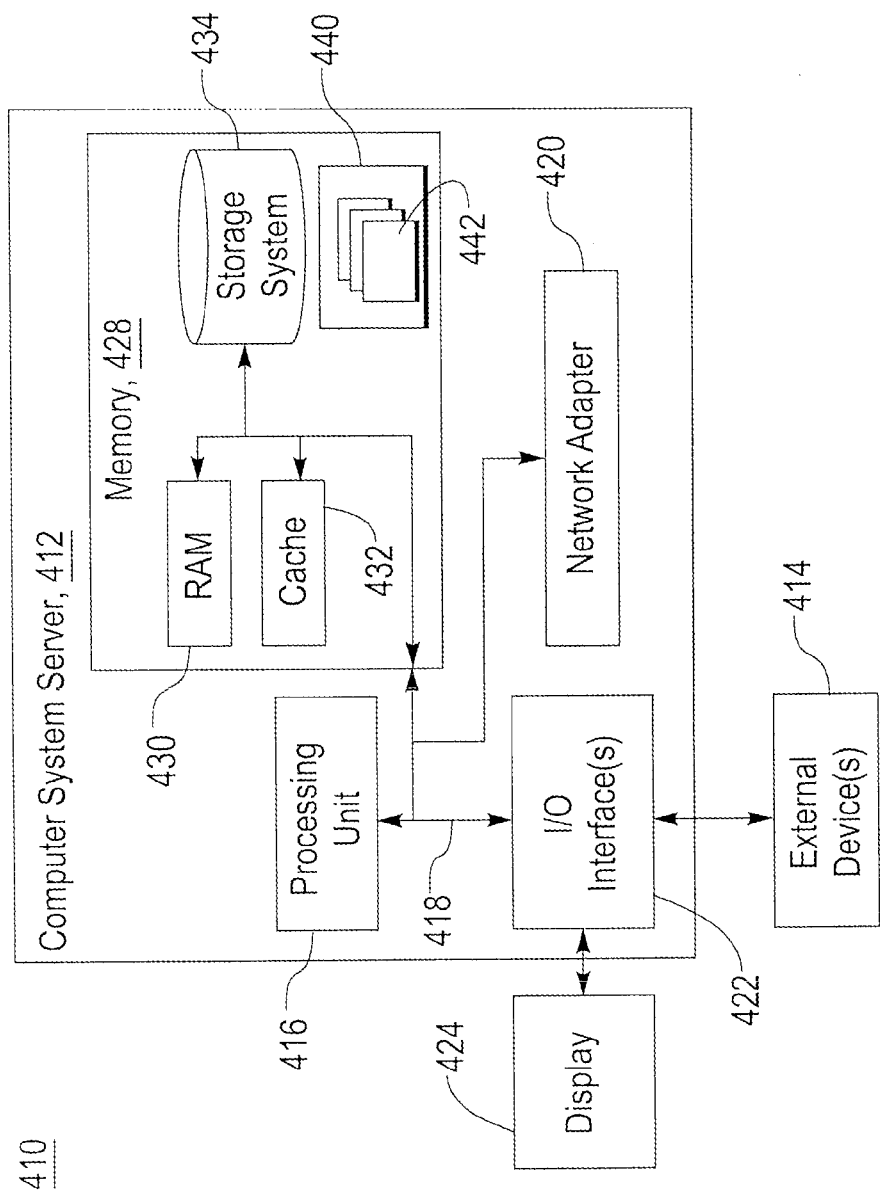
FIG. 4 shows an exemplary cloud computing node 410, in accordance with an embodiment of the present principles.

Referring now to FIG. 4, a schematic of an example of a cloud computing node 410 is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
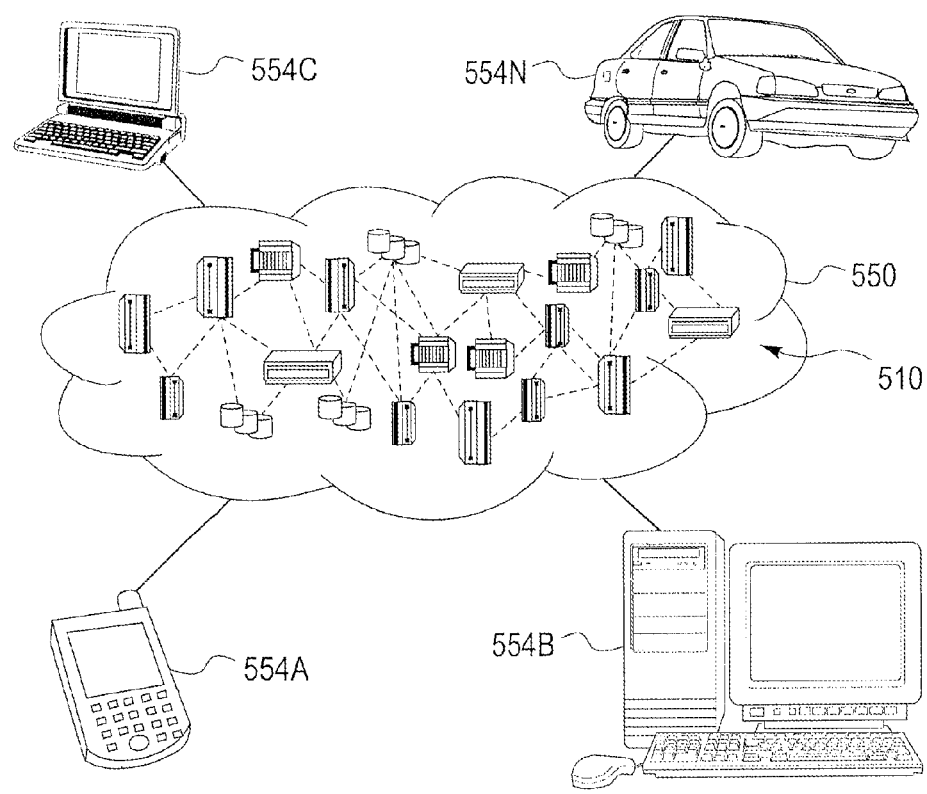
FIG. 5 shows an exemplary cloud computing environment 550, in accordance with an embodiment of the present principles.

Referring now to FIG. 5, illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
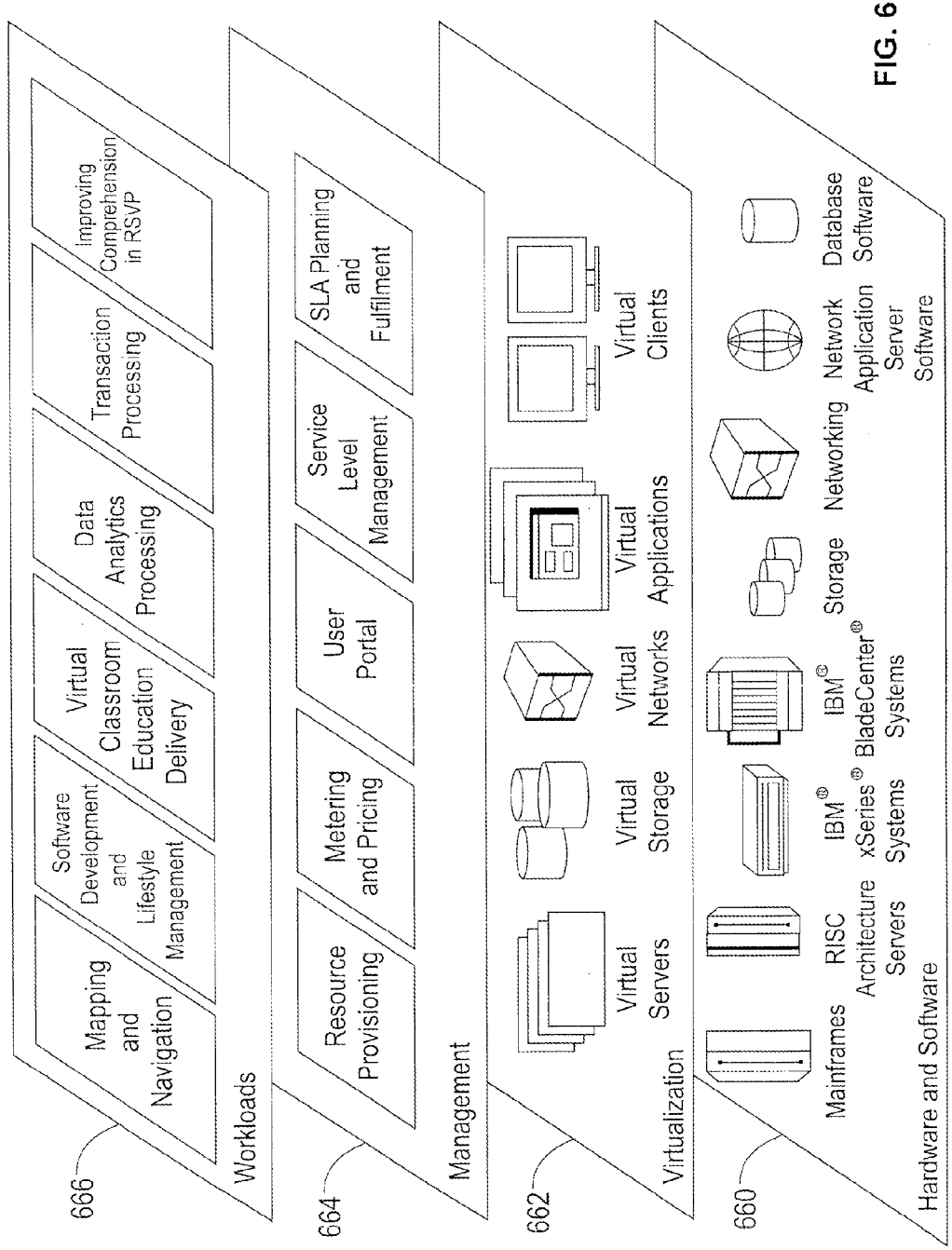
FIG. 6 shows exemplary abstraction model layers, in accordance with an embodiment of the present principles.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and improving comprehension in RSVP.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method, comprising:
    receiving, by a processor, a plurality of words comprised in a rapid serial visual presentation;
    determining, by a processor, a cognitive load of the plurality of words by using at least one metric, the cognitive load being determined on any of a word level and a word sequence level;
    calculating, by the processor, a variable presentation rate for the plurality of words based on the cognitive load, the variable presentation rate capable of being varied on any of the word level and the word sequence level; and
    controlling, by the processor, a displaying of the plurality of words on a display device in accordance with the calculated variable presentation rate based on a threshold by temporarily reducing the variable presentation rate responsive to the cognitive load being above the threshold.

2. The computer-implemented method of claim 1, wherein the at least one metric comprises a dictionary-based metric for identifying any of the plurality of words that are absent from a dictionary responsive to a comparison of the plurality of words against existing words in the dictionary.

3. The computer-implemented method of claim 1, wherein the at least one metric comprises a capitalization-based metric for identifying unfamiliar proper nouns from among the plurality of words responsive to a comparison of the plurality of words against capitalization rules.

4. The computer-implemented method of claim 1, wherein the at least one metric comprises a statistical-language-model-based metric for identifying any of the plurality of words and word sequences formed thereby having a respective low probability of occurrence responsive to a comparison of the plurality of words and the word sequences against a statistical language model.

5. The computer-implemented method of claim 1, wherein the at least one metric comprises an eye-based metric for identifying at least one of an increased rate of eye blinks and an increased pupil dilation in relation to a predetermined eye blink range and a predetermined pupil dilation range.

6. The computer-implemented method of claim 1, wherein said controlling step comprises temporarily reducing a presentation rate of the plurality of words responsive to at least one of the increased rate of eye blinks and the increased pupil dilation in relation to the predetermined eye blink range and the predetermined pupil dilation range.

7. The computer-implemented method of claim 1, wherein the at least one metric comprises a phone-based metric for identifying phones in the plurality of words.

8. The computer-implemented method of claim 7, further comprising determining an estimated speaking rate of the plurality of words using the phone-based metric, and wherein the variable presentation rate of the plurality of words is calculated responsive to the estimated speaking rate.

9. The computer-implemented method of claim 7, wherein said controlling step comprises temporarily reducing a presentation rate of the plurality of words responsive to an amount of the phones in one or more words being above the threshold.

10. A computer-implemented method, comprising:
receiving, by a processor, a plurality of words comprised in a rapid serial visual presentation;
determining, by the processor, a cognitive load of the plurality of words by using at least one metric, the cognitive load being determined based on at least one of a word level, a word sequence level, a moving average of recently viewed word or word sequences, a trend in the moving average of recently viewed word or word sequences;
calculating, by the processor, a variable presentation rate for the plurality of words based on the cognitive load, the variable presentation rate capable of being varied on any of the word level and the word sequence level; and
controlling, by the processor, a displaying of the plurality of words on a display device in accordance with the calculated variable presentation rate based on a threshold by temporarily reducing the variable presentation rate responsive to the cognitive load being above the threshold.

11. The computer-implemented method of claim 1, wherein the at least one metric comprises a dictionary-based metric for identifying any of the plurality of words that are absent from a dictionary responsive to a comparison of the plurality of words against existing words in the dictionary.

12. The computer-implemented method of claim 1, wherein the at least one metric comprises a capitalization-based metric for identifying unfamiliar proper nouns from among the plurality of words responsive to a comparison of the plurality of words against capitalization rules.

13. The computer-implemented method of claim 1, wherein the at least one metric comprises a statistical-language-model-based metric for identifying any of the plurality of words and word sequences formed thereby having a respective low probability of occurrence responsive to a comparison of the plurality of words and the word sequences against a statistical language model.

14. The computer-implemented method of claim 1, wherein the at least one metric comprises an eye-based metric for identifying at least one of an increased rate of eye blinks and an increased pupil dilation in relation to a predetermined eye blink range and a predetermined pupil dilation range.

15. The computer-implemented method of claim 1, wherein said controlling step comprises temporarily reducing a presentation rate of the plurality of words responsive to at least one of the increased rate of eye blinks and the increased pupil dilation in relation to the predetermined eye blink range and the predetermined pupil dilation range.

16. The computer-implemented method of claim 1, wherein the at least one metric comprises a phone-based metric for identifying phones in the plurality of words.

17. The computer-implemented method of claim 16, further comprising determining an estimated speaking rate of the plurality of words using the phone-based metric, and wherein the variable presentation rate of the plurality of words is calculated responsive to the estimated speaking rate.

18. The computer-implemented method of claim 16, wherein said controlling step comprises temporarily reducing a presentation rate of the plurality of words responsive to an amount of the phones in one or more words being above the threshold.

* * * * *